US 9,884,708 B2

(12) United States Patent
Cole et al.

(10) Patent No.: US 9,884,708 B2
(45) Date of Patent: Feb. 6, 2018

(54) ANTI-SLIP TIE WITH WAVE SPRINGS

(71) Applicant: Thomas & Betts International, LLC, Wilmington, DE (US)

(72) Inventors: Andrew C. Cole, Southaven, MS (US); Ryan M. Rufty, Wilmington, DE (US)

(73) Assignee: Thomas & Betts International LLC, Wilmington, DE (US)

( * ) Notice: Subject to any disclaimer, the term of this patent is extended or adjusted under 35 U.S.C. 154(b) by 57 days.

(21) Appl. No.: 14/920,418

(22) Filed: Oct. 22, 2015

(65) Prior Publication Data
US 2016/0114948 A1    Apr. 28, 2016

Related U.S. Application Data

(60) Provisional application No. 62/067,856, filed on Oct. 23, 2014.

(51) Int. Cl.
*B65D 63/10* (2006.01)
*B65D 63/08* (2006.01)
*B65D 63/02* (2006.01)

(52) U.S. Cl.
CPC ......... *B65D 63/1027* (2013.01); *B65D 63/02* (2013.01); *B65D 63/08* (2013.01); *B65D 63/109* (2013.01)

(58) Field of Classification Search
CPC .... B65D 63/1027; B65D 63/02; B65D 63/08; B65D 63/109
See application file for complete search history.

(56) References Cited

U.S. PATENT DOCUMENTS

| 1,592,479 A | 7/1926 | Williams |
| 3,082,498 A | 3/1963 | Oetiker |
| 3,402,436 A | 10/1965 | Oetiker |

(Continued)

FOREIGN PATENT DOCUMENTS

| CA | 137828 | 1/1912 |
| CA | 2113880 | 8/1994 |

(Continued)

OTHER PUBLICATIONS

International Search Report and Written Opinion dated Jan. 21, 2016 for corresponding International Application No. PCT/US 15/56999.

*Primary Examiner* — Robert J Sandy
*Assistant Examiner* — Rowland Do
(74) *Attorney, Agent, or Firm* — Taft Stettinius & Hollister LLP

(57) ABSTRACT

A tie includes a band that extends lengthwise from a first end to a second end. The tie also includes a housing, affixed near the second end, with a first opening to receive the first end of the band when the first end of the band is brought toward the housing in a loop. The housing includes: walls that enclose a space and have a stop toward the second end of the band; a first mass in the space; and a second mass placed in the space and between the first mass and the stop. When the first end is inserted into the housing, the first end passes under the first mass and the second mass and exerts a pull on the first mass toward the second mass. When the first mass is pulled toward the second mass, the second mass acts as a spring between the first mass and the stop and prevents the first mass from hitting the stop.

18 Claims, 9 Drawing Sheets

(56) References Cited

U.S. PATENT DOCUMENTS

| | | | |
|---|---|---|---|
| 3,360,879 A | | 1/1968 | Freitag |
| 4,235,404 A | | 11/1980 | Kraus |
| 4,308,648 A | | 1/1982 | Fay |
| 4,366,602 A | * | 1/1983 | Conlon .................. B65D 63/08 24/136 A |
| 4,402,113 A | | 9/1983 | Smith |
| 4,518,297 A | * | 5/1985 | Kraus ................. F16B 37/0842 24/16 PB |
| 4,843,686 A | * | 7/1989 | Bartholomew ......... F16L 33/12 24/19 |
| 4,910,832 A | | 3/1990 | Schaub et al. |
| 4,919,682 A | | 4/1990 | Bellazzi |
| 5,013,182 A | | 5/1991 | Coulvonvaux et al. |
| 5,230,126 A | | 7/1993 | Oetiker |
| 5,307,541 A | | 5/1994 | Nagano |
| 5,353,478 A | * | 10/1994 | Spors ................... F16L 33/035 24/20 CW |
| 5,537,721 A | | 7/1996 | Oetiker |
| 5,544,392 A | | 8/1996 | Oetiker |
| 5,548,876 A | * | 8/1996 | Oetiker ................. B65D 63/02 24/20 CW |
| 5,581,851 A | | 12/1996 | Nagano |
| 5,706,558 A | | 1/1998 | Sauer |
| D424,417 S | | 5/2000 | Axelsson |
| D424,921 S | | 5/2000 | Axelsson |
| D426,458 S | | 6/2000 | Axelsson |
| 6,076,235 A | | 6/2000 | Khokhar |
| 6,935,001 B2 | | 8/2005 | Barriuso et al. |
| 7,389,568 B2 | | 6/2008 | Crockett, IV et al. |
| 7,930,805 B2 | | 4/2011 | Bulanda |
| 8,230,556 B2 | | 7/2012 | Palau Dominguez |
| 8,607,420 B2 | | 12/2013 | De Campos et al. |
| 2013/0333164 A1 | | 12/2013 | Dinh et al. |

FOREIGN PATENT DOCUMENTS

| | | |
|---|---|---|
| CA | 2169492 | 9/1996 |
| CA | 2394804 | 4/2002 |
| CA | 2135219 | 5/2006 |
| CA | 2155771 | 9/2006 |
| CA | 2155770 | 11/2006 |
| CA | 2616347 | 2/2007 |
| CA | 2169309 | 4/2007 |
| KR | 1020090099790 | 9/2012 |
| WO | 2010139421 | 9/2010 |

* cited by examiner

ANTI-SLIP TIE WITH WAVE SPRINGS

RELATED APPLICATION

This application claims priority under 35 U.S.C. §119 based on U.S. Provisional Patent Application No. 62/067,856 filed Oct. 25, 2014, the disclosure of which is incorporated by reference herein in its entirety.

BACKGROUND INFORMATION

A cable tie is used for fastening, binding, bundling, and/or organizing cables/wires, pipes, pieces of wood, and/or any other items/load that can be tied with rope, rape, etc. Different types of cable ties are made for use in different environments and applications. For example, some cable ties are made for outdoor use. Some cable ties are made for a specific industry, such as the food industry. Some are made for heavy-duty use (e.g., cable ties made of metal), for bundling large cables.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements.

As used herein, the term "cable tie" may refer to a tie for binding different types of items, such as wires, cables, pipes, etc.

As described herein, an anti-slip cable tie may provide for a small/minimum slack in binding, fastening or bundling cables. To tie/bundle cables using the anti-slip cable tie, one end of a band, of the cable tie, that encircles the cables is inserted into the housing of a locking body of the cable tie. When the end of the band is inserted within the housing of the locking body, the band pushes a ball bearing within the housing toward an inner wall of the housing. Another ball within the housing, however, prevents the ball bearing from moving backwards beyond a point and bumping into the inner wall. When the band is pulled/tugged in the forward direction away from the inner wall, the ball bearing, being close to a front of the wall, prevents the end of the band from slipping and locks the band in place. Because the other ball prevents the ball bearing from moving about in the housing, the ball bearing continues to lock the band in place.

Figure 1A:
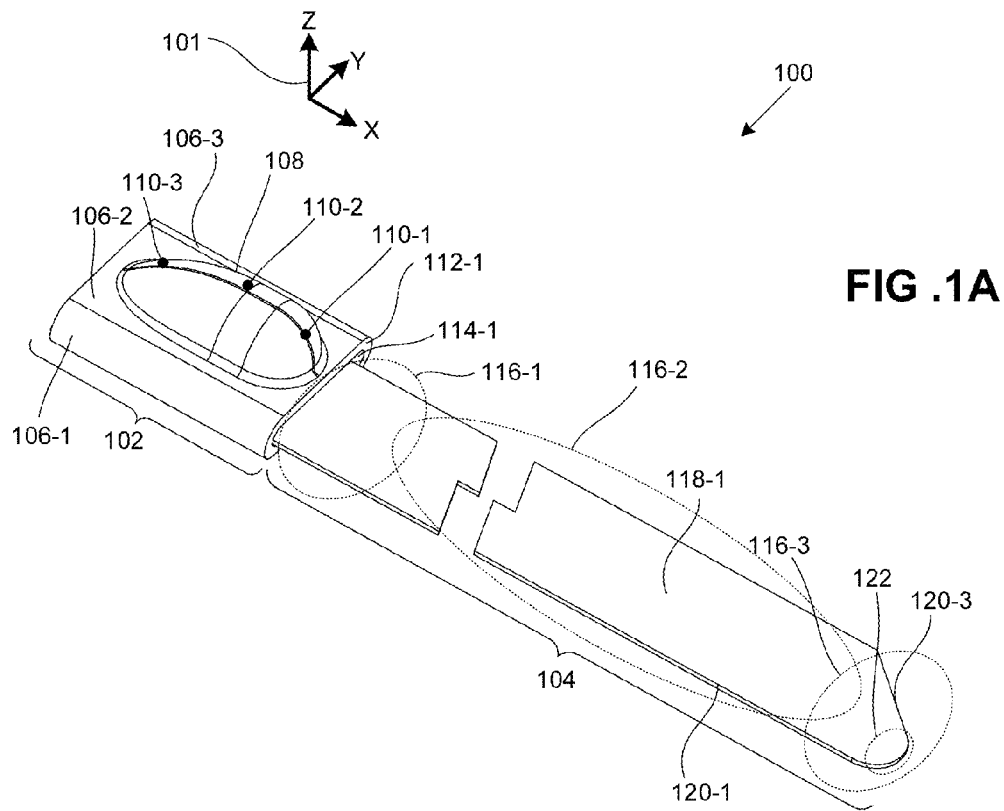
FIG. 1A is an isometric perspective top/side view of an exemplary cable tie in an open configuration according to one implementation.

FIG. 1A shows an isometric perspective top/side view of an exemplary cable tie 100 in an open configuration according to one implementation, together with an xyz-axes 101. As shown, cable tie 100 includes locking body 102 and a band 104. In FIG. 1A, cable tie 100 is oriented such that band 104 extends along the x-axis of xyz-axes 101 and the unit normal vector of the flat surface of band 104 is parallel to the z-axis. Band 104 has an interior portion inside of housing 108.

When band 104 is wrapped about cables and an end of band 104 (e.g., section 116-3) is inserted within locking body 102, locking body 102 prevents the end from slipping back out of locking body 102 and the band from unwrapping about the cables.

Locking body 102 includes a side wall 106-1, a top wall 106-2, a side wall 106-3, bottom walls 106-4 and 106-5 (shown in FIG. 1B), and housing 108. Walls 106-1 through 106-5 (collectively referred to as "walls 106") extend along the x-axis from a side face 112-1 to a side face 112-2 (shown in FIG. 1B). In one implementation, walls 106 may be made of one continuous strip of rigid material wrapped (e.g., loosely) about band 104, such that there is a gap/opening 114-1 and gap/opening 114-2 (FIG. 1B) between walls 106 and band 104.

Housing 108 includes a side portion 110-1 (also referred to as a "stop 110-1"), a top portion 110-2, and a side portion 110-3 (collectively referred to as "portions 110"). As further described below, portions 110 are configured/shaped to enclose and interact with elements within housing 108, to prevent a portion of band 104 (which was inserted through opening 114-1 and 114-2) from sliding out from housing 108 when anti-slip cable tie 100 is in the closed configuration. In FIG. 1A, housing 108 is in the shape of a dome, and may be made of steel, plastic, or another suitable material.

Band 104 includes an entrance section 116-1, a middle section 116-2, and an end section 116-3. Band 104 also includes edges, two of which are illustrated as a side edge 120-1 and front edge 120-3. In one embodiment, side edge 120-1 and front edge 120-3 form an acute angle, such that, along the side edge 120-1 and parallel to the x-axis, the end of band 104 tapers to a tip 122 that can be more easily inserted into a gap/opening 114-2 (see FIG. 1B) after band 104 is bound around cables/wires, to result in a closed (loop) configuration. The end of tip 122 may be rounded, so that a user may not easily and accidentally puncture oneself with tip 122. In one embodiment, when band 104 binds/bundles cables/wires, bottom surface 118-2 (FIG. 1B) of band 104 may face the cables/wires and be in contact with the cables/wires. Band 104 may be made of flexible material, such as steel, or another material.

Figure 1B:
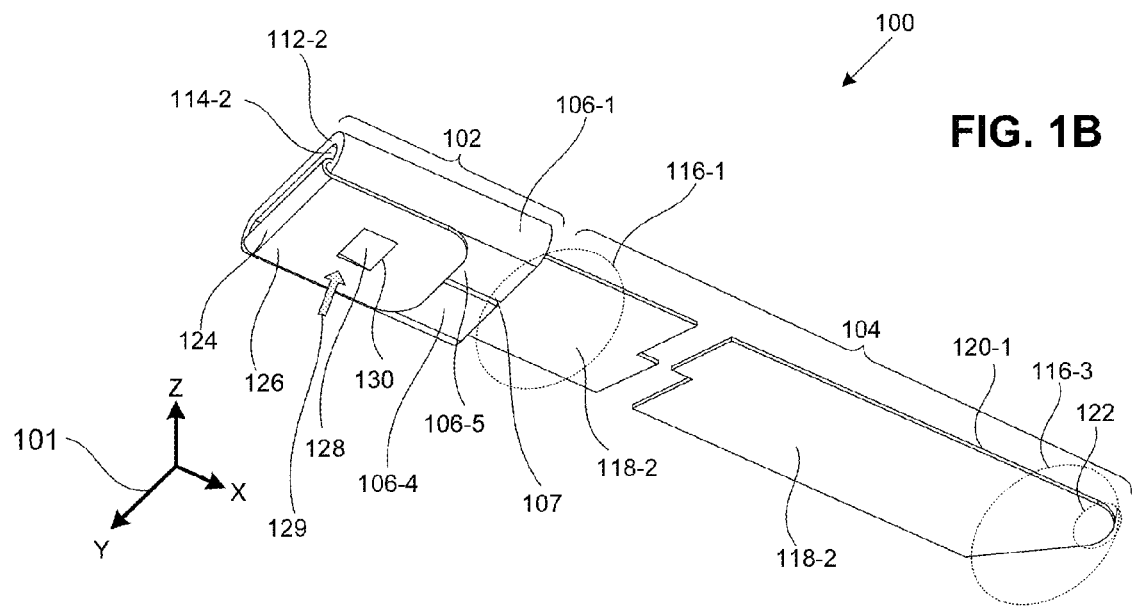
FIG. 1B is an isometric perspective bottom/side view of the cable tie of FIG. 1A in the open configuration.

FIG. 1B shows an isometric perspective bottom/side view of cable tie 100 in an open configuration, together with an xyz-axes 101. FIG. 1B illustrates a number of features, of cable tie 100, that are not shown in FIG. 1A. For example, FIG. 1B shows side edge 112-2 with gap/opening 114-2. FIG. 1B also shows band 104 extending from entrance portion 116-1 into locking body 102 (along the negative x-axis) and exiting from locking body 102 via opening 114-2 to form a clip 124 with a flap 126 that covers bottom walls 106-4 and 106-5. As shown, clip 124 and flap 126 are integrally formed with band 104. In a different implementation, clip 124 and flap 126 be constructed separately from band 104 and then affixed together via screws or another mechanism.

As shown in FIG. 1B, flap 126 includes, in one embodiment, at about the middle of its surface, a tab 128 with a crease 130. Bottom walls 106-4 and 106-5 above tab 128 has a hole (e.g., a square hole whose front edge is aligned with a front edge of tab 128) (not shown in FIG. 1B). Tab 128 is thrust upward in the direction of arrow 129 into the hole, bent about crease 130 (e.g., in the direction of the z-axis).

In this configuration, side walls 106-1 and 106-3 of locking body 102, clip 124, and tab 128 hold/affix a portion of locking body 102 to an interior portion of band 104, with the bottom surface 118-2 of band 104 being flush with an interior surface (the surface within locking body 102) of bottom walls 106-4 and 106-5 and the top surface of flap 126 being flush with the exterior surface (the surface in the −z direction) of bottom walls 106-4 and 106-5. Side walls 106-1 and 106-3 prevent the interior portion of band 104 from moving laterally in the negative/positive y-direction with respect to locking body 102. Clip 124, which is integral to band 124, prevents locking body 102 from sliding in the negative/positive x-direction relative to the interior portion of band 104. Tab 128, having been pushed into the hole in bottom walls 106-4 and 106-5, catches an edge of the hole when an external force is applied to locking body 102 relative to the interior portion of band 104 in the positive x-direction. Tab 128 and the hole prevents locking body 102 from sliding in the x-direction relative to the interior portion of band 104.

Figure 2:
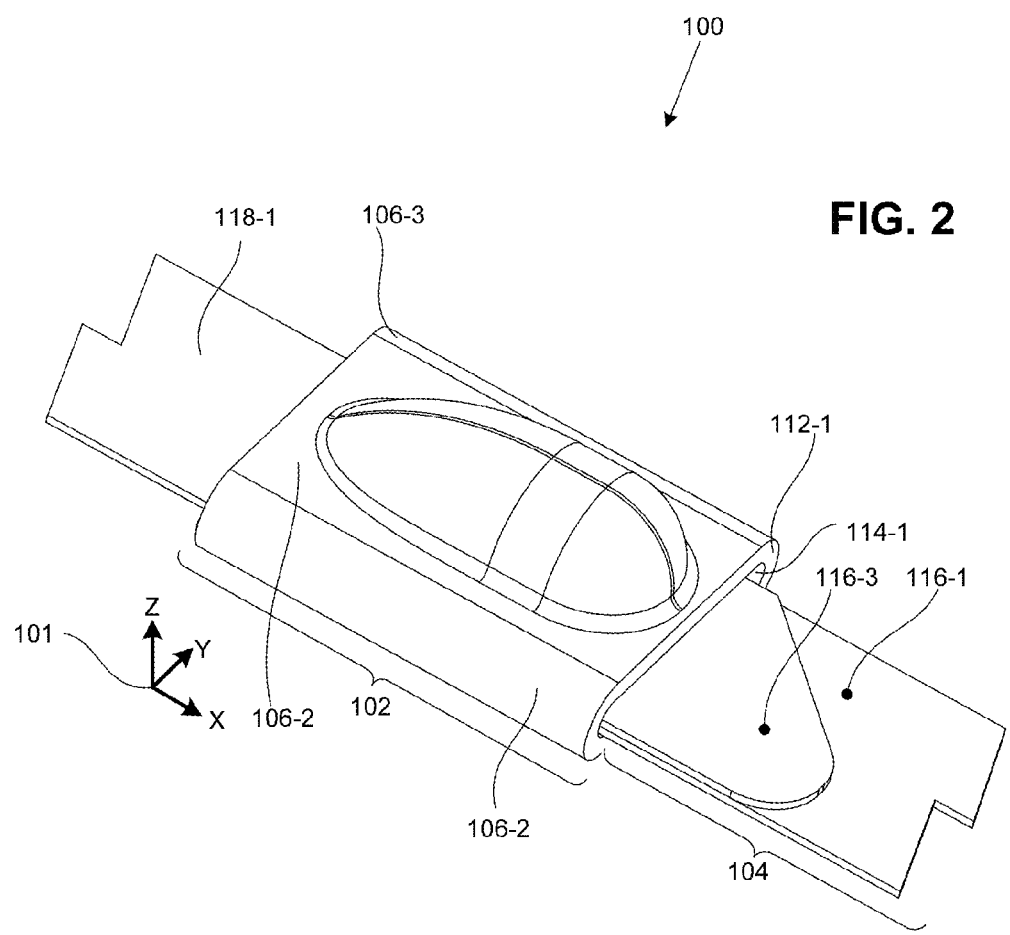
FIG. 2 is an expanded isometric perspective top/side view of the cable tie of FIG. 1A in the closed configuration.

FIG. 2 is an expanded isometric perspective top/side view of cable tie 100 in the closed configuration. In FIG. 2, end portion 116-3 of band 104 has been inserted into gap/hole 114-2 formed at side wall 112-2 of locking body 102, and passed through and out of locking body 102 via gap/hole 114-1, resulting in the closed configuration. In the configuration, a section/portion of band 104 (e.g., end section 116-3) overlaps with entrance portion 116-1 of band 104. In FIG. 2, bottom surface 118-2 of end section 116-3 would be in contact with the top surface 118-1 of entrance section 116-1.

Figure 3:
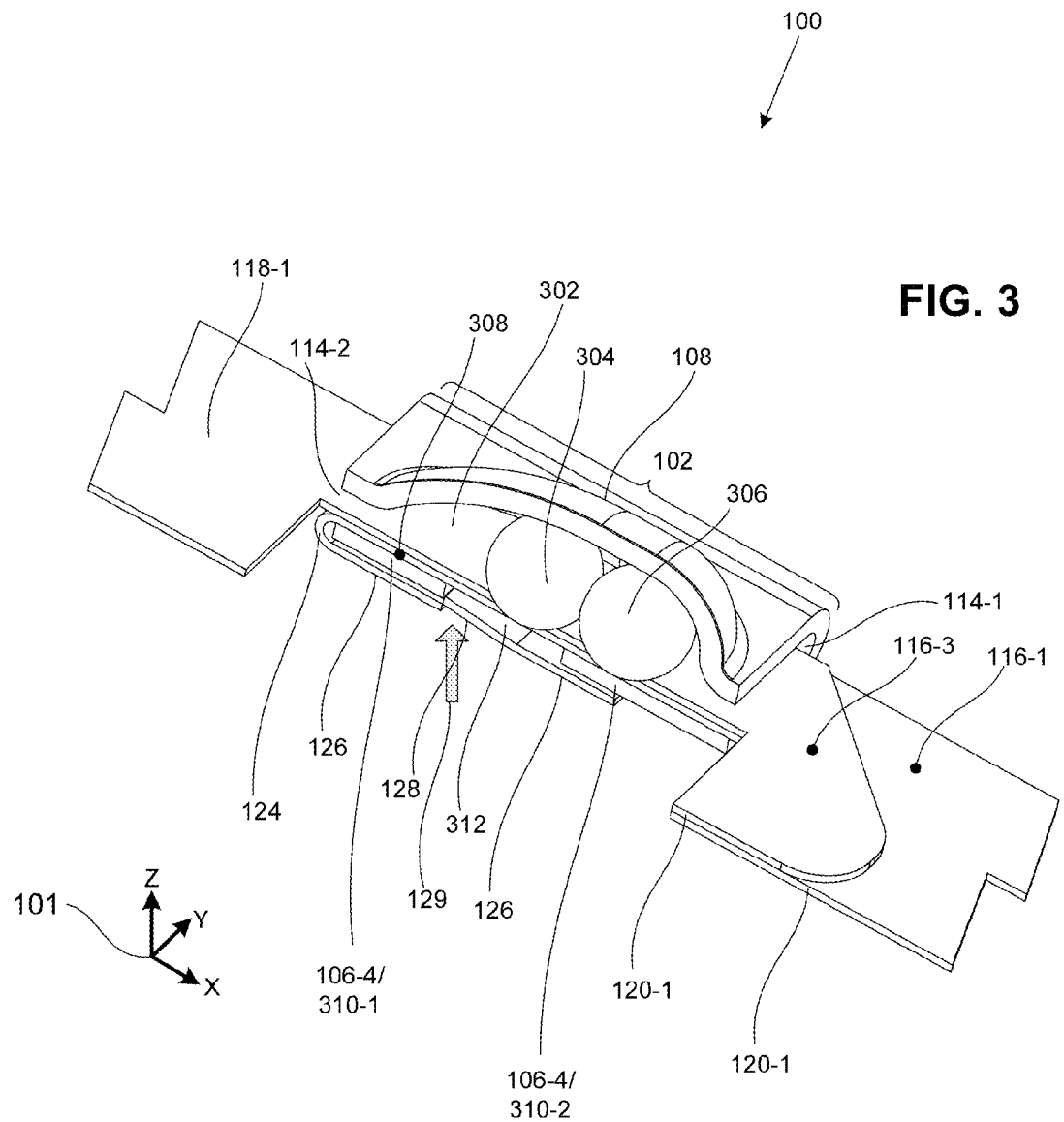
FIG. 3 is an isometric cut-away perspective top/side view of the cable tie of FIG. 1A in the closed configuration.

FIG. 3 is an isometric cut-away perspective top/side view of cable tie 100 in the closed configuration. FIG. 3 shows a number of features that are not visible in FIG. 1A through FIG. 2. As shown, housing 108 encloses space 302 in which a ball bearing 304 and sphere 306 are placed. In one implementation, ball bearing 304 may be made of metal (e.g., steel) and sphere 306 may be made of elastomeric or another material (e.g., plastic, rubber, sponge-like or spring-like material, stainless steel sponge, etc.). In the implementation illustrated in FIG. 3, ball bearing 304 and sphere 306 may have approximately the same diameter. In other implementations, the diameters may be different.

FIG. 3 also shows entrance portion 116-1 extending into housing 108 as an interior section/portion 308, which joins clip 124. In the closed configuration, interior section 308 is underneath end section 116-3 and above bottom walls 106-4 and 106-5. In FIG. 3, bottom wall 106-4 is illustrated as having front area 310-1 and a rear area 310-2. Between front area 310-1 and rear area 310-2 is a hole 312, into which tab 128 protrudes in the direction of arrow 129. Hole 312 may be in the shape of a rectangle, square, and/or another shape (e.g., circle, etc.) As explained above, an edge of tab 128 engages an edge of hole 312 if housing 108 is pushed/pulled in the x-direction relative to interior section 308, and prevents housing 108 from sliding in the x-direction relative to interior section 308 (e.g., prevents housing 108 from detaching from interior portion 308 of band 104).

Figure 4A:
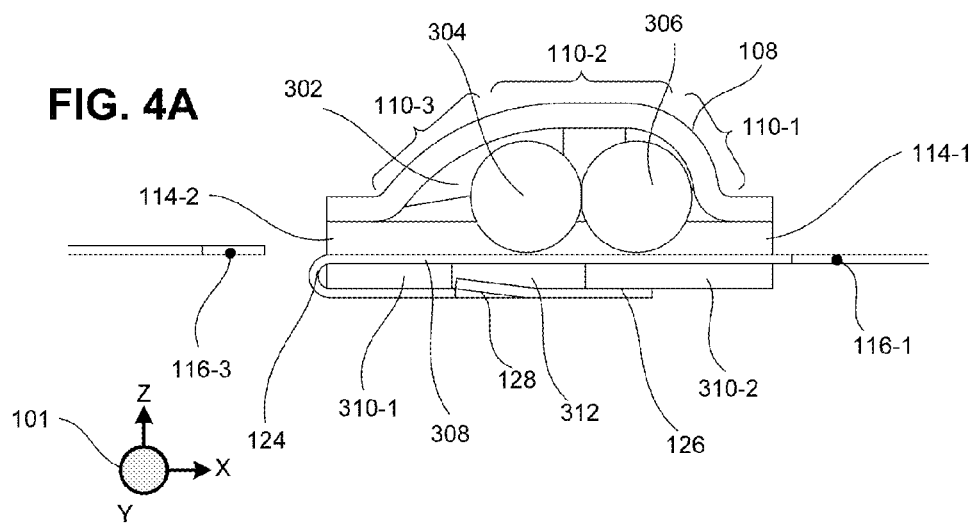
FIG. 4A is a cross-sectional side view of the cable tie before an end of the cable tie of FIG. 1A is inserted into a locking body of the cable tie.
Figure 4B:
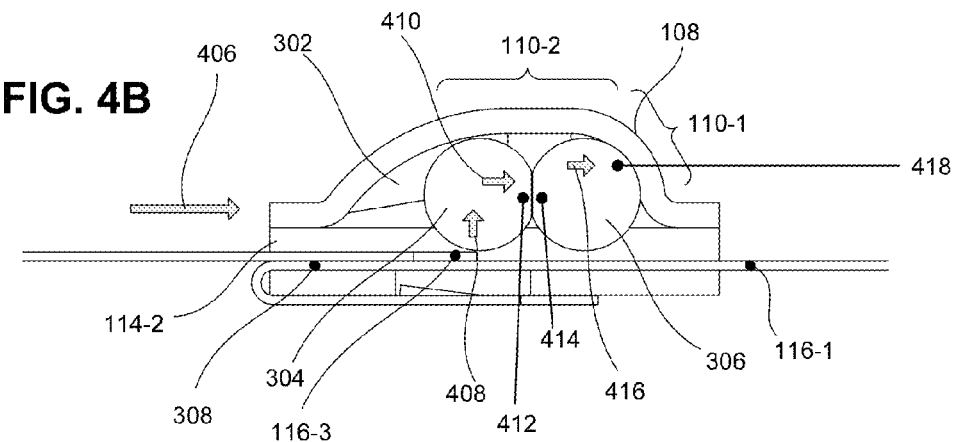
FIG. 4B is a cross-sectional side view of the cable tie when the end of the cable tie of FIG. 1A is partially inserted into the locking body of the cable tie.
Figure 4C:
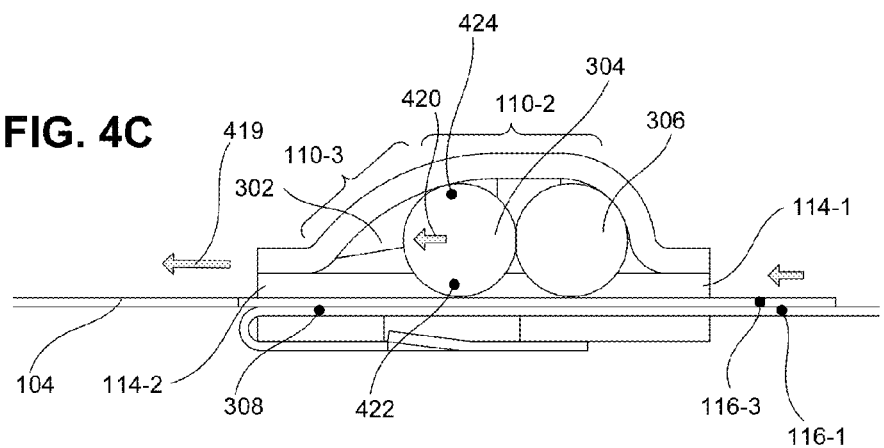
FIG. 4C is a cross-sectional side views of the cable tie after the end of the cable tie of FIG. 1A is inserted into the locking body and the cable tie is in the closed configuration.

FIGS. 4A through 4C are cross-sectional side views of cable tie 100 at different stages of closing cable tie 100 into a loop. FIG. 4A is a cross sectional side view of cable tie 100 before end section 116-3 of band 104 is inserted into locking body 102 via gap/opening 114-2 to be in the closed configuration. Like FIG. 3, FIG. 4A shows ball bearing 304 and sphere 306 occupying space 302 of housing 108.

FIG. 4B is a cross sectional side view of cable tie 100 when end section 116-1 of band 104 is partially inserted into locking body 102 of cable tie 100. In FIG. 4B, after band 104 is wrapped about a bundle of cables/wires, end section 116-3 is pushed in the direction of arrow 406 via gap/opening 114-2 into housing 108. Consequently, end section 116-3 overlaps with interior section 308. As end section 116-3 moves further in the direction of arrow 406, section 116-3 pushes ball bearing 304, causing ball bearing 304 to move in the direction of arrow 408, such that section 116-3 may slide underneath ball bearing 304. In addition, section 116-3 also pushes ball bearing 304 in the direction of arrow 410, causing an area 412 on ball bearing 304 to contact an area 414 of sphere 306. Although the force on area 414 pushes sphere 306 in the direction of arrow 416, because area 418 of sphere 416 is in contact with stop 110-1 (or the interior surface of side portion 110-1) of housing 108, sphere 306 moves, in the direction of x-axis, little or no distance. Accordingly, sphere 306 prevents ball bearing 304 from moving further in the direction of arrow 410 and touching stop 110-1.

FIG. 4C is a cross sectional side view of cable tie 100 after end section 116-3 of band 104 is inserted into locking body 102 and cable tie 100 is in the closed configuration. In FIG. 4C, having been inserted fully into housing 108, end section 116-3 overlaps with entrance section 116-1. From this position, if band 104 is pulled in the direction of arrow 419, the frictional force between band 104 and ball bearing 304 causes ball bearing 304 to move in the direction of arrow 420 to the extent that there is space/clearance in space 302. Because space 302 within housing 108 is tapered in the negative x-direction, as ball bearing 304 is driven in the direction of arrow 420 until ball contacts the surface of portion 110-3 (also referred to as "stop 110-3"), area 424 and 422 of ball bearing 304 exert increasing force on the interior surface of portion 110-3 of housing 108 and on the top surface of end section 116-3 of band 104, respectively. The downward force exerted by area 422 of ball bearing 304 on end section 116-3 may pinch end section 116-3 between ball bearing 304 and interior section 308, and thus prevent end section 116-3 from retreating back in the direction of arrow 410 through gap/opening 114-2. That is, ball bearing 304 provides for the locking mechanism of cable tie 100.

As briefly discussed above, in a different embodiment without sphere 306 in space 302, when end section 116-3 is inserted into housing 108, end section 116-3 may cause ball bearing 304 to move all the way (or significant portion of the way) to stop 110-1 of housing 108. With ball bearing 304 in such a position, if band 104 were pulled back in the direction of arrow 419 (e.g., due to the weight of cables that are bound by cable tie 100), as end section 116-3 moves in the same direction relative to housing 108, ball bearing 304 would also move from the stop 110-1 of housing 108 toward the interior surface of portion 110-3 of housing 108, until ball bearing 304 locks end section 116-3, and, therefore, band 104. The distance covered by ball bearing 304 until ball bearing 304 locks band 104 is approximately the amount of slippage of band 104 allowed by cable tie 100. The slippage may result in an undesirable amount of slack in band 104 when cable tie 100 is in the closed configuration, with band 104 wrapped about cables/wires.

In contrast, with sphere 306 in place as illustrated in FIGS. 3, 4A, 4B, and 4C, ball bearing 304 cannot move in the direction of arrow 410 when end section 116-3 is inserted into housing 108 (or can only move a small amount). Hence, when band 104 is pulled in the direction of arrow 419 (e.g., by the weight of the cables that are wrapped by band 104), ball bearing 304 cannot travel as significant of a distance until ball bearing 304 locks band 104. In other words, sphere 306 may prevent band 104 from slipping, and helping to prevent unwanted slack between band 104 and the cables bundled by cable tie 100 (e.g., slipping distance<the distance occupied by sphere 306 (e.g., the diameter)).

Figure 5A:
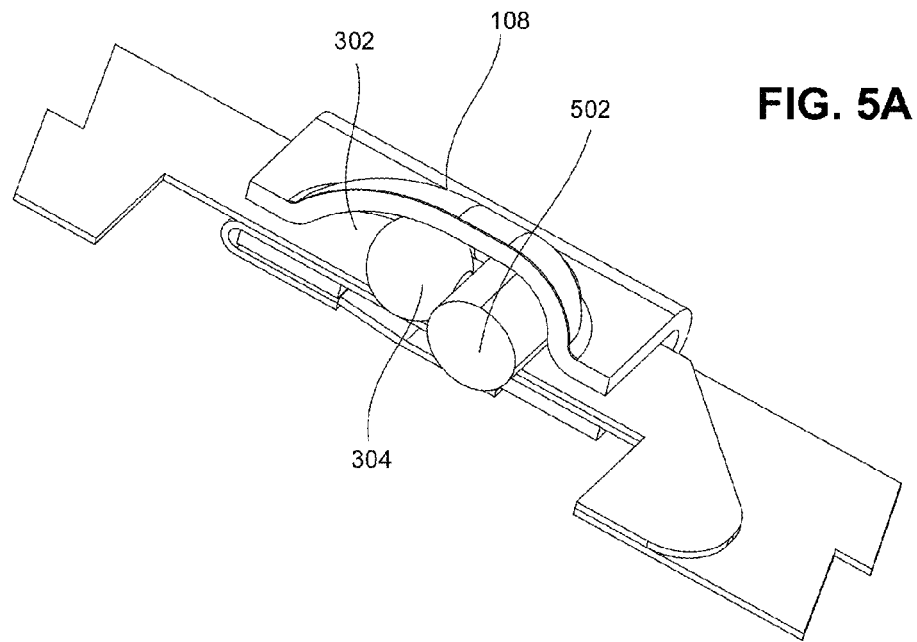
FIG. 5A is an isometric cut-away perspective top/side view of the cable tie according to another implementation.

FIG. 5A is an isometric cut-away perspective top/side view of cable tie 100 according to another implementation. In this implementation, cable tie 100 includes, in place of sphere 306, a cylinder 502. Cylinder 502 may play a role similar to that of sphere 306 in the implementations described above.

Figure 5B:
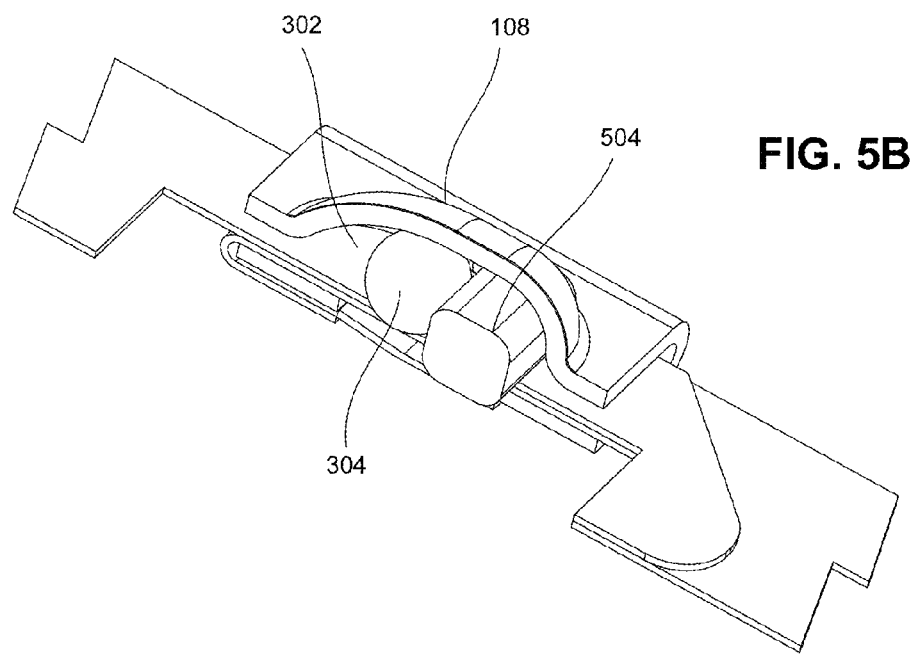
FIG. 5B is an isometric cut-away perspective top/side view of the cable tie according to yet another implementation.

FIG. 5B is an isometric cut-away perspective top/side view of cable tie 100 according to another implementation. In this implementation, cable 100 includes, in place of sphere 306, a block 504. Block 504 may prevent ball bearing 304 from allowing undesirable slippage of band 104 when band 104 is closed around cables/wires, in a manner similar to that described above for sphere 306 (e.g., by occupying a space between ball bearing 304 and stop 110-1 of housing 108.

Figure 6A:
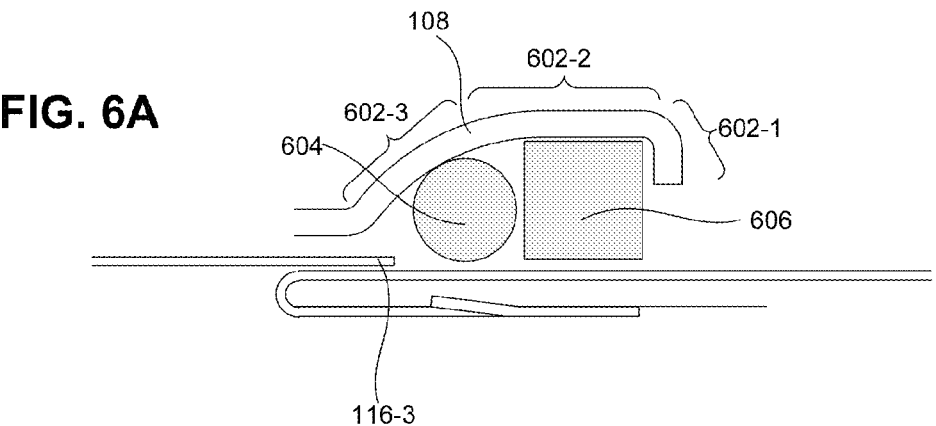
FIGS. 6A-6C are cross-sectional side views of the cable tie according to different implementations.
Figure 6B:
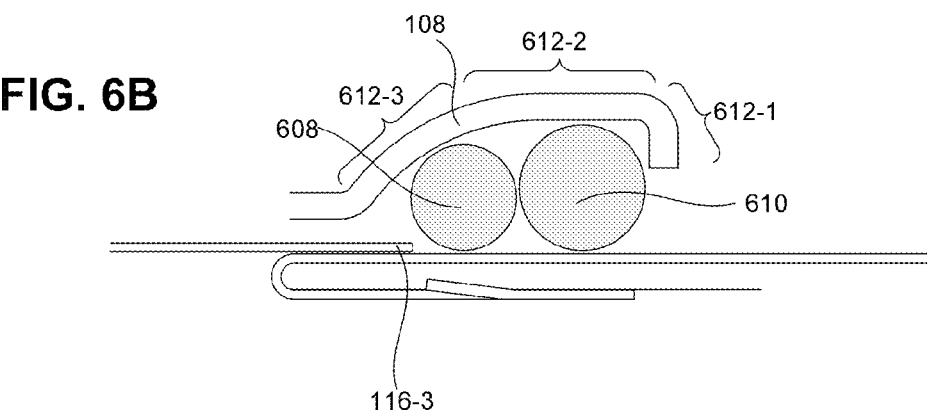
Figure 6C:
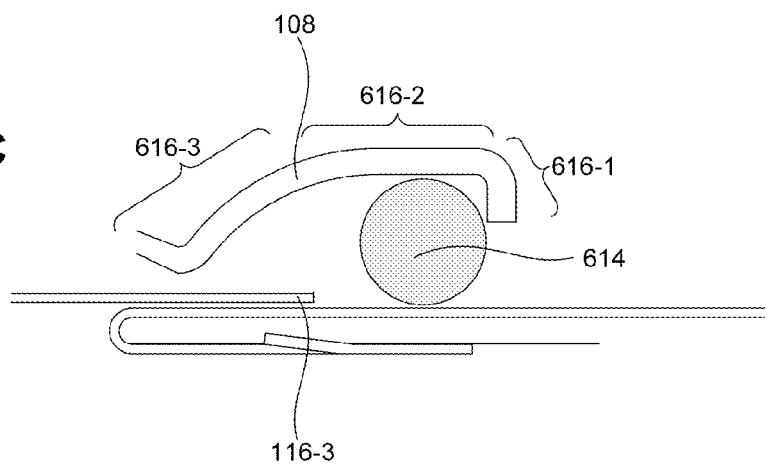

FIGS. 6A-6C are cross-sectional side views of cable tie 100 according to other implementations. FIG. 6A shows the cross-sectional view of cable tie 100 according to one implementation. In this implementation, ball bearing 604, square/cube 606, and side portions 602-1 through 602-3 correspond to ball bearing 304, sphere 306, and side portions 110-1 through 110-3, respectively, illustrated in FIGS. 4A-4C. Furthermore, each of ball bearing 604, cube 606, side portions 602-1 through 602-3 has a functional role corresponding to the role of bearing 304, sphere 306, and side portions 110-1 through 110-3, respectively. In addition, cube 606 acts as a spring between bearing 604 and side portion 110-1. Cube 606 exerts a pressure on bearing 604 by pushing against side portion 602-1 and bearing 604. This prevents bearing 604 from moving away substantially from portion 602-3, and reducing the force on section 116-3 when section 116-3 is fully inserted in housing 108.

In a typical implementation, cube 606 may be made of resilient material, such as stainless steel or stainless steel wire mesh. Depending on the implementation, cube 606 may be replaced by a stainless steel mesh of another shape, such as a round ball, cylinder, rectangular box/prism, etc. In contrast to portions 110 in FIG. 4A-4C, portions 602 may be shorter or longer—that is, portions 602 may extend to properly accommodate cube 606.

FIG. 6B shows the cross-sectional view of cable tie 100 according to yet another implementation. In this implementation, ball bearing 608 and sphere 610 and side portions 612-1 through 612-3 correspond to ball bearing 304, sphere 306, and side portions 110-1 through 110-3, respectively, illustrated in FIGS. 4A-4C. Each of ball bearing 608, sphere 610, side portions 612-1 through 612-3 has a functional role similar to the role of bearing 304, sphere 306, and side portions 110-1 through 110-3, respectively. In this implementation, ball bearing 608 is smaller (i.e., has a smaller diameter) than sphere 610 such that ball bearing 608 occupies slack/room in housing 108. Ball bearing 608 and sphere 610 prevent each other from "sloshing" in housing 108 (by occupying the space in housing 108), and thus prevent reduction of the force exerted by bearing 608 and/or sphere 610 on section 116-3 when section 116-3 is fully inserted in housing 108.

Portions 612 may be dimensioned to properly accommodate ball bearing 608 and sphere 610. In some implementations, both ball bearing 608 and sphere 610 may be composed of the same or similar materials (e.g., stainless steel).

FIG. 6C shows the cross-sectional view of cable tie 100 according to yet another implementation. In this implementation, sphere 614 corresponds to ball bearing 304 and sphere 306, and portions 616-1 through 616-3 correspond to portions 110-1 through 110-3 illustrated in FIGS. 4A-4C. In FIG. 6C, portions 616-1, 616-2, and 616-3 are shaped/cut such that portions 616-1 and/or 616-2 ("housing 108" or buckle) act as backstop against sphere 614. Once inserted into housing 108, section 116-3 acts as a leaf spring on sphere 614 and pushes sphere 614 against portions 616-1 through 616-3. That is, when section 116-3 of cable tie 100 is inserted in housing/buckle 108, sphere 614 is pressed against portions 616 (e.g., especially portions 616-1 and 616-2) by section 116-3. When section 116-3 is being pulled back out of housing 108, sphere 614 is pulled toward portion 616-3, which increases the force applied by section 116-3 against sphere 614. This causes sphere 614 to increase its force on portion 616-3 and section 116-3, preventing section 116-3 from being pulled out of housing 108. In this implementation, section 116-3's leaf-spring action against sphere 614 and the shape of portions 616 prevent sphere 614 from moving substantially away from portion 616-3. This causes sphere 614 to maintain constant pressure on section 116-3 and not allow section 116-3 to slip away from within housing 108.

In some implementations, interior portion 308 may include a "dimple" or a hole. In other implementations, interior portion 308 excludes (i.e., is without) a dimple or a hole. If a hole or a dimple exists on interior portion 308, when section 116-3 is fully inserted into housing 108, bearing/sphere (e.g., any one of bearing 304, sphere 306, cylinder 502, cube 606, bearing 608, sphere 610, or sphere 614) may drive the area (of section 116-3) on which the bearing sits into the hole (on interior portion 308) underneath section 116-3. In this way, the dimple or hole on interior portion 308 may further stabilize the bearing/sphere. when section 116-3 is locked by the bearing/sphere.

Figure 7A:
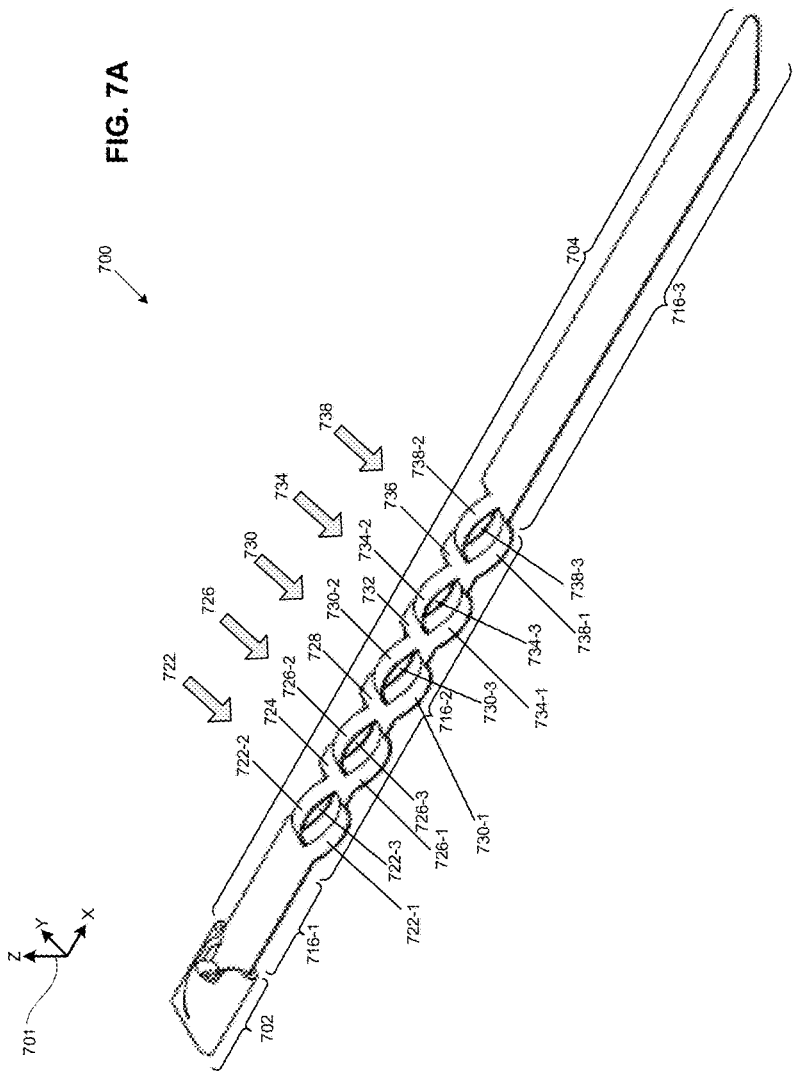
FIG. 7A is an isometric perspective top/side view of an exemplary cable tie in the open configuration according to another implementation.
Figure 7B:
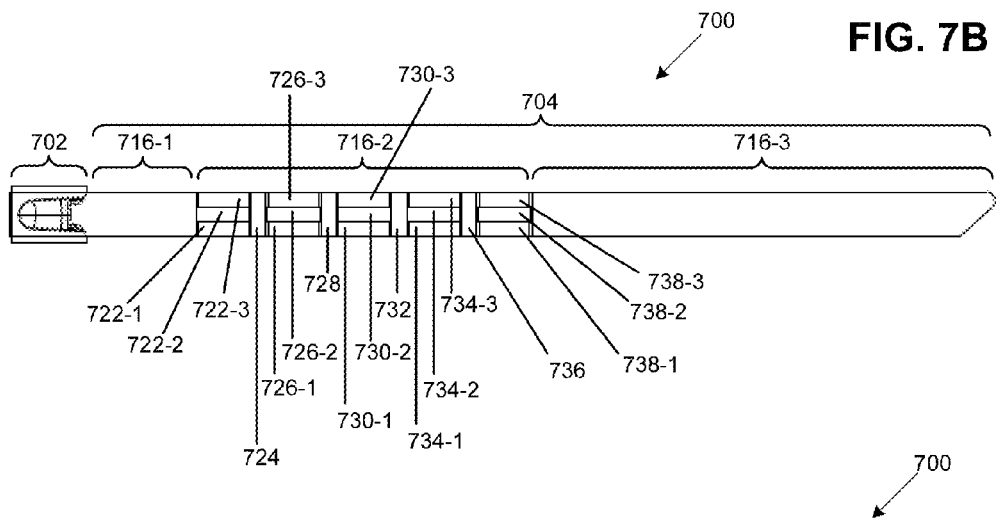
FIGS. 7B and 7C are top and side views, respectively, of the cable tie of FIG. 7A.
Figure 7C:
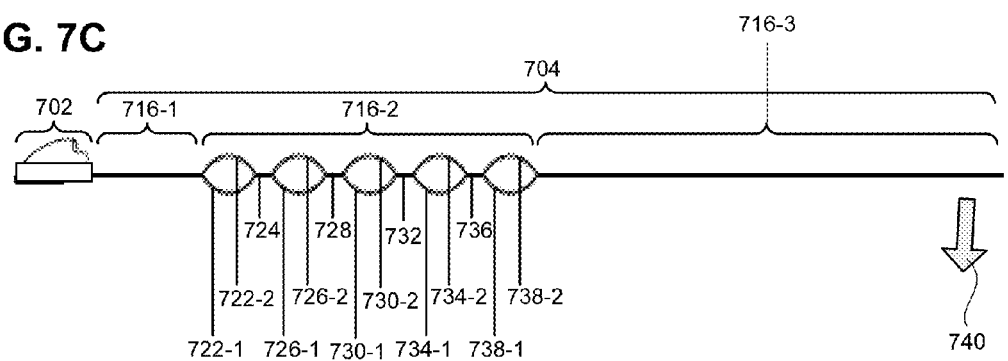

FIG. 7A is an isometric perspective top/side view of an exemplary cable tie 700 in the open configuration according to another implementation. FIGS. 7B and 7C are top and side views, respectively, of the cable tie of FIG. 7A. As shown in FIGS. 7A-7C, cable tie 700 may include a locking body 702 and a band 704.

Locking body 702 includes similar components as locking body 102 and is made of the same material as locking body 102. In addition, locking body 702 may operate similarly as locking body 102.

Band 704 includes similar components and is made of the same material as band 104. Band 704 also operates similarly to band 104. In contrast to band 102, however, band 704 includes front section 716-1, spring section 716-2, and end section 716-3.

As further shown, spring section 716-2 includes five wave springs, 722, 726, 730, 734, and 738. Each of wave springs 722, 726, 730, and 734 includes downward arcs, an upward arc, and an end piece. For example, wave spring 722 includes downward arcs 722-1 and 722-3, upward arc 722-2, and end piece 724. As shown, each of wave springs 726, 730, and 734 include similar components as wave spring 722. Wave spring 738 is slightly different from other wave springs 722, 726, 730, and 734 in that wave spring 738 does not include an end piece.

A downward arc may include a strip that is curved convex relative to the bottom surface of band 704 (the downward arc is also curved concave relative to the top surface of band 704). Conversely, an upward arc may include a strip that is curved convex relative to the top surface of band 704 (the upward arc is also curved concave relative to the bottom surface of band 704). For wave spring 722, one end of downward arc 722-1 is attached to a piece that precedes wave spring 722 (i.e., front section 716 in this case) and the other end of downward arc 722-1 is attached to end piece 724. Similarly, one end of downward arc 722-3 is attached to a piece that precedes wave spring 722 (i.e., front section 716) and the other end of downward arc 722-3 is attached to end piece 724. Upward arc 722-2 is similarly configured. The arcs of other wave springs 726, 730, and 734 are arranged similarly as those of wave spring 722. For wave spring 738, one ends of downward arcs 738-1 and 738-3 and upward arc 738-2 are attached to end section 716-3 (since there is no end piece for wave spring 738).

For each of the wave springs 722, 726, 730, and 734, its end piece interconnects its upward and downward arcs. (e.g., arcs 722 are connected to one other via end piece 724). Hence, each end piece allows the corresponding wave spring to function as a single unit and provides necessary rigidity to the wave spring. Without the end piece, for example, downward arc 722-1 of wave spring 722 would be directly attached to arc 726-1 of the next wave spring 726, and thus form a continuous series of arcs. The series of arcs 722-1 and 726-1 would be free to move relative to another series of upward arcs (i.e., 722-2 and 726-2) parallel to downward arcs 722-1 and 726-1.

As illustrated in FIG. 7C, to wrap cable tie 700 about a load (e.g., bundle of cables, pipes, beams, pencils, wires, etc.) (not shown) under tie 700, end section 716-3 of tie 700 may be to bent in the direction of arrow 740. Once wrapped about the load, end section 716-3 may be inserted into locking body 702 and tightened (e.g., by pulling on end section 716-3). Tightening cable tie 700 may exert different force components on each of the wave springs.

Figure 7D:
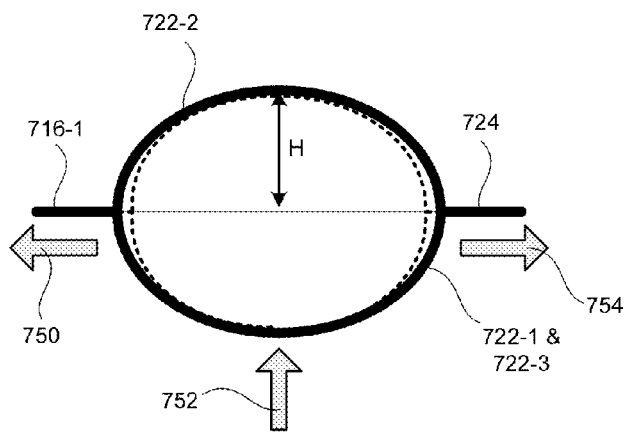
FIG. 7D illustrates different forces that are applied to one of exemplary wave springs of FIGS. 7A-7C.

FIG. 7D illustrates different forces that are applied to wave spring 722 of cable tie 700 when cable tie 700 is in use and tightened. FIG. 7D shows the original shape of arcs 722-1 through 722-3 in dotted lines and the final shape of the arcs in solid lines after the forces act on the arcs.

As shown, as the result of tightening cable tie 700, pulling forces are applied to the ends of arcs 722-1 through 722-3 in the directions of arrows 750 and 754, by front section 716-1 and end piece 724. The forces widen (or spread apart) arcs 722-1 through 722-3 in the same directions as the arrows. As the arcs widen, the arcs exert restorative forces (spring's force) in the directions opposite to those of the arrows, to front section 716-1 and end piece 724. The restorative forces from each of the wave springs 722, 726, 730, 734, and 738 are transmitted throughout band 704, keeping tie 700 tight around the load and in equilibrium against the pulling forces. The constant tension in cable tie 700 may keep end section 716-3 in locking body 702 from sliding further into body 702 (e.g., due to vibration or other disturbances) and may prevent locking mechanisms within locking body 702 (e.g., square/cube 606, ball bearing 608, sphere 610, etc.) from moving and providing slack to cable tie 700. That is, the tension allows cable tie 700 to absorb any vibrations that may cause, without the wave springs, over time, locking body 702 to disengage band 704 or tie 700 from becoming loose.

When tie 700 is wrapped around a load, a portion(s) on the underside of arc 702-1 (as shown by arrow 752) may contact the load. The portion in contact with the load may experience a force applied by the load, as the result of tie 700 being wrapped about the load. For example, assume that the load contacts the portion of arc 722-1 at the point of arrow 752. The portion would experience a force in the direction of arrow 752. The force would result in further widening of lower arc 722-1. The restorative forces due to upper arc 722-2 may aid in counteracting the widening. That is, upper arc 722-2 provides reinforcement to lower arcs 722-1 and 722-3.

In FIG. 7B, each arc in a wave spring is approximately ⅓ of the width of tie 700. In a different implementation, the width of each arc in a wave spring may be wider or narrower than those of other arcs in the spring. Each arc may be made longer/shorter (i.e., in the lengthwise direction of tie 700) taller/less tall (in the direction of arrow H in FIG. 7D). Such changes may provide more flexibility or rigidity to tie 700. For example, increasing the lengths of upper/lower arcs 722-1 through 722-3 may increase the flexibility of wave spring 722. The size of the end pieces (e.g., pieces 724, 728, 732, and 736) in the lengthwise direction of band 704 may also be increased or decreased (e.g., decreased to zero length).

Figure 7E:
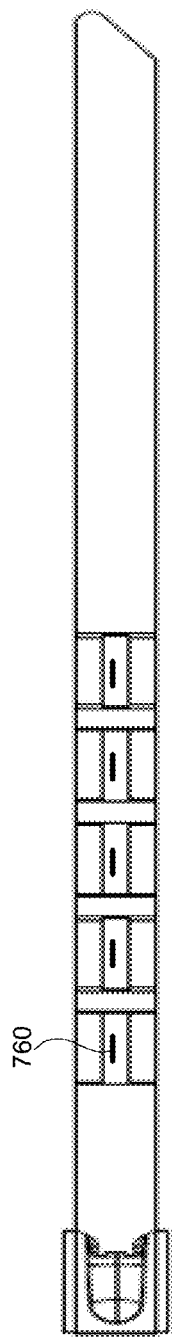
FIGS. 7E and 7F illustrate different indentations on the wave springs of FIGS. 7A-7C.
Figure 7F:
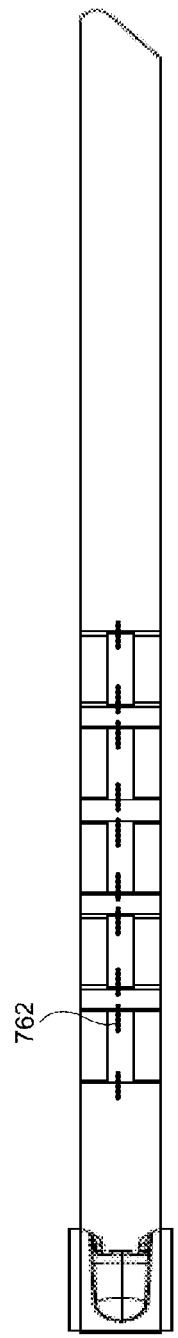

FIG. 7A or 7B show the surfaces of the arcs as being relatively smooth and without markings. In some implementations, as illustrated in FIG. 7E, for some of the arcs (e.g., upper arcs), a deep, lengthwise indentation/groove 760 may be placed on the top surface of each arc. This may increase the rigidity or tensile strength of the arcs. In other implementations, as illustrated in FIG. 7F, a groove/indentation 762 that extends from approximately a portion of an arc to a portion of end piece may be placed on each of the wave springs (e.g., upper arcs 722-2, 726-2, etc.). This may bolster and provide further strength to the portion of the arc that attaches to the end piece. Although FIGS. 7E and 7F illustrate the indentations/grooves on the top surface of the upper arcs, in other implementations, the indentations/grooves may also be made on the lower arcs, on the bottom surface of tie 700.

Although FIGS. 7A-7C, 7E, and 7F show front section 716-1 as being shorter than spring section 716-2, which is shown as shorter than end section 716-3, in other implementations, the relative lengths of the sections may vary. Furthermore, although FIGS. 7A-7C, 7E and 7F show only one spring section 716-2, other implementations may include additional spring sections. In such an implementation, each of the wave springs may or may not include two lower arcs and a single upper arc. For example, a wave spring may include two upper arcs and one lower arc, or alternatively, three lower arcs and two upper arcs. The number of arc(s) in one wave spring also may be the same or different from those of another wave spring.

The foregoing description of implementations provides illustration, but is not intended to be exhaustive or to limit the implementations to the precise form disclosed. Modifications and variations are possible in light of the above teachings or may be acquired from practice of the teachings. For example, in some implementations, housing 108 may be shaped differently than that illustrated in FIGS. 1-6C. Furthermore, in some implementations, more than a single sphere 306, cylinder 502, or block 504 may be placed within housing 108 to prevent ball bearing 304 from "sloshing" and allowing slippage of band 104 in the closed configuration. In some implementations, in place of sphere 306 or cylinder 502, or block 504, a spring or spring-like component may be placed in housing 108 to prevent slippage. Furthermore, depending on the implementation, a different type of band 104 may be used in place of band 104 (e.g., thicker band, narrower band, etc.). In still other implementations, top surface 118-1 of band 104, the interior surfaces of housing 108, and/or ball bearing 304 may include ridges to increase the friction between top surface 118-1 of band 104, the interior surfaces of housing 108, and/or ball bearing 304.

Although different implementations have been described above, it is expressly understood that it will be apparent to persons skilled in the relevant art that the implementations may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

It should be emphasized that the term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A tie comprising:
   a band including a bottom surface and a top surface, comprising:
   a front section that extends lengthwise from one end of the band,
   a spring section that extends lengthwise from the front section, and
   an end section that extends lengthwise from the spring section; and
   a housing, affixed near the front section, with a first opening to receive the end section of the band when the end section of the band is brought toward the housing in a loop, wherein the housing is configured to lock the end section of the band in place when the housing receives the end section via the first opening;
   wherein the spring section includes wave springs attached in series;
   wherein one end of a first of the wave springs is attached to the front section, and the other end of the first of the wave springs is attached to one end of a second of the wave springs;
   wherein each of the wave springs comprises:
   an upper arc that is convex relative to the top surface of the band;
   a lower arc that is lengthwise parallel to the upper arc and that is convex relative to the bottom surface of the band; and
   an end piece to which the upper arc and the lower arc are attached; and
   wherein when the band is wrapped about one or more items, the end section is inserted into the housing, and the band is tightened about the items, the front section and the end section apply stretching forces on the wave springs of the spring section and the wave springs apply restorative forces on the band, resulting in a tension throughout the band,
   wherein the housing comprises:
   walls that enclose a space and have a stop toward the end section of the band;
   a first mass in the space; and
   a second mass placed in the space and between the first mass and the stop;
   wherein when the end section is inserted into the housing, the end section passes under the first mass and the second mass and exerts a pull on the first mass toward the second mass,
   wherein when the first mass is pulled toward the second mass, the second mass acts as a spring between the first mass and the stop and prevents the first mass from hitting the stop, and
   wherein, after the end section is inserted into the housing and when the end section is being pulled out of the housing, due to a force exerted by the second mass to the first mass and the walls, the first mass squeezes the end section against a bottom of the housing and locks the end section in the housing.

2. The tie of claim 1, wherein the wave springs include three or more wave springs.

3. The tie of claim 1, wherein one end of a last of the wave springs is attached to one end of another of the wave springs and the other end of the last of the wave springs is attached to the end section.

4. The tie of claim 1, wherein the upper arc includes an indentation on the top surface.

5. The tie of claim 1, wherein each of the wave springs further comprises:
   another lower arc that is lengthwise parallel to the upper arc and that is convex relative to the bottom surface of the band.

6. The tie of claim 5, wherein widths of the lower arcs and the upper arc are equal.

7. The tie of claim 1, wherein, on one of the wave springs, an indentation on the top surface extends from a portion of an upper arc to a portion of an end piece.

8. The tie of claim 1, wherein the end section of the band is tapered.

9. A tie comprising:
   a band having a first end and a second end;
   a housing, affixed to the band near the second end, with a first opening to receive the first end of the band, configured to lock the first end of the band in place when the housing receives the first end via the first opening;
   wherein the band includes wave springs attached in series;

wherein each of the wave springs includes:
- an upper arc that is convex relative to one surface of the band; and
- a lower arc that is lengthwise parallel to the upper arc and convex relative to another surface of the band;

wherein when the band is wrapped about one or more items and tightened, stretching forces are applied on the wave springs and the wave springs apply restorative forces on the band, resulting in a tension, throughout the band, that prevents the band from providing slack to the first end, wherein the housing comprises:
- a first mass and a second mass in a space enclosed by the housing, wherein, after the first end is inserted into the housing and when the first end is being pulled out of the housing, the first mass squeezes the first end against a bottom of the housing and locks the first end in the housing, and wherein the second mass prevents the first mass from moving about in the space and prevents the first mass from allowing the first end to slip.

10. The tie of claim 9, wherein the wave springs include at least four wave springs.

11. The tie of claim 9, wherein one end of a last of the wave springs is attached to one end of one of the wave springs.

12. The tie of claim 9, wherein the upper arc includes an indentation on its top surface.

13. The tie of claim 9, wherein each of the wave springs further comprises:
- another lower arc that is lengthwise parallel to the upper arc and that is convex relative to the other surface of the band.

14. The tie of claim 13, wherein widths of the lower arcs and the upper arc are equal.

15. The tie of claim 9, wherein the first mass includes a sphere.

16. The tie of claim 15, wherein the sphere comprises elastomeric material; or steel.

17. The tie of claim 9, wherein the second mass includes: stainless steel wire mesh.

18. The tie of claim 9, wherein the first end of the band is tapered.

* * * * *